(12) United States Patent
Kim et al.

(10) Patent No.: US 10,164,246 B2
(45) Date of Patent: Dec. 25, 2018

(54) SULFUR-CARBON COMPOSITE AND PREPARING METHOD THEREOF

(71) Applicant: OCI COMPANY LTD., Seoul (KR)

(72) Inventors: Yo-Seop Kim, Seongnam-si (KR); Hae-Min Yoo, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 62 days.

(21) Appl. No.: 15/381,925

(22) Filed: Dec. 16, 2016

(65) Prior Publication Data

US 2017/0179471 A1 Jun. 22, 2017

(30) Foreign Application Priority Data

Dec. 17, 2015 (KR) ........................ 10-2015-0180933

(51) Int. Cl.

| | |
|---|---|
| H01M 4/36 | (2006.01) |
| H01M 4/38 | (2006.01) |
| H01M 4/587 | (2010.01) |
| H01M 4/62 | (2006.01) |
| C08K 5/36 | (2006.01) |
| C08K 3/30 | (2006.01) |
| C08K 3/06 | (2006.01) |
| C08K 3/04 | (2006.01) |
| H01M 4/04 | (2006.01) |

(52) U.S. Cl.
CPC .............. *H01M 4/364* (2013.01); *C08K 3/04* (2013.01); *C08K 3/06* (2013.01); *C08K 3/30* (2013.01); *H01M 4/0471* (2013.01); *H01M 4/38* (2013.01); *H01M 4/587* (2013.01); *H01M 4/625* (2013.01)

(58) Field of Classification Search
None
See application file for complete search history.

(56) References Cited

U.S. PATENT DOCUMENTS

| | | | |
|---|---|---|---|
| 2008/0160391 A1* | 7/2008 | Joo | B01J 21/18 429/482 |
| 2011/0256254 A1* | 10/2011 | Yen | B29C 45/2628 425/123 |
| 2012/0119158 A1* | 5/2012 | Barchasz | C01B 17/0248 252/502 |
| 2014/0050992 A1* | 2/2014 | Panchenko | H01M 4/133 429/338 |
| 2014/0186695 A1* | 7/2014 | Moganty | H01M 4/1397 429/188 |
| 2015/0303454 A1* | 10/2015 | Otter | H01M 4/364 252/182.1 |

FOREIGN PATENT DOCUMENTS

| | | |
|---|---|---|
| KR | 10-2015-0043407 A | 4/2015 |
| KR | 10-2015-0045304 A | 4/2015 |

OTHER PUBLICATIONS

Korean Office Action dated Jun. 13, 2017 corresponding to Korean Application No. KR 10-2015-0180933.

* cited by examiner

*Primary Examiner* — Katie L Hammer
(74) *Attorney, Agent, or Firm* — Hauptman Ham, LLP (57) ABSTRACT

The present disclosure relates to a sulfur-carbon composite and a preparing method thereof, and more particularly, to a sulfur-carbon composite having an aggregated structure by performing a pressure heat treatment on a mixture of a carbonaceous conductive material and a sulfur-containing amorphous carbon material and carbonizing the same, and a preparing method thereof.

8 Claims, 5 Drawing Sheets

SULFUR (light dots)

SULFUR-CARBON COMPOSITE AND PREPARING METHOD THEREOF

CROSS-REFERENCE TO RELATED APPLICATIONS

This application claims the priority of Korean Patent Application No. 10-2015-0180933 filed on Dec. 17, 2015, in the Korean Intellectual Property Office, the disclosure of which is hereby incorporated by reference in its entirety.

BACKGROUND

1. Technical Field

The present disclosure relates to a sulfur-carbon composite and a preparing method thereof, and more particularly, to a sulfur-carbon composite having an aggregated structure by performing a pressure heat treatment on a mixture of a carbonaceous conductive material and a sulfur-containing amorphous carbon material and carbonizing the same, and a preparing method thereof.

2. Description of the Related Art

Secondary batteries have been used as large capacity power storage batteries for electric vehicles or battery energy storage systems and as high performance energy sources for mobile electronic apparatuses such as mobile phones, camcorders, and laptop computers.

Lithium-ion batteries, as secondary batteries, have merits such as high energy density and large capacity per area, compared to nickel-manganese batteries or nickel-cadmium batteries. However, the lithium-ion batteries have various demerits such as deterioration of stability by overheat, low energy density, and low output properties.

To address the demerits of the lithium-ion batteries, research and development of lithium-sulfur secondary batteries or lithium-air secondary batteries having high output and high energy density is actively being performed.

Among them, the lithium-sulfur secondary battery, which uses sulfur as a cathode active material and lithium metal as an anode, exhibits an energy density of 2,500 Wh/kg, five times greater than the theoretic energy density of existing lithium-ion batteries, so that the lithium-sulfur secondary battery is suitable for batteries for electric vehicles requiring high output and high energy density.

In spite of the above merits, when sulfur is used as an active material, a use ratio of sulfur participating in an electrochemical oxidation-reduction reaction in a battery to a total amount of sulfur input as a raw material is low so that capacity of a battery is actually lower than a theoretic capacity.

Such a problem may be generated for various reasons. As a typical example, most known cathode active materials for lithium-sulfur secondary batteries are composites in which sulfur is injected into mesopores and micropores of a carbonaceous conductive material used as a support for sulfur. However, in composites according to the related art, sulfur-aggregates are generated due to irregular injection of sulfur into the composites or sulfur is not regularly distributed in the composite.

In addition, in the case of the composite in which sulfur is inserted into mesopores and micropores of a conductive material that is simply used as a support for sulfur, during electrochemical oxidation-reduction reaction of a lithium-sulfur secondary battery, the sulfur easily leaks into an electrolyte so that lifespan of the battery is deteriorated. Furthermore, as lithium-polysulfide that is a reduced sulfur leaks into the electrolyte, a shuttle phenomenon occurs in which the lithium-polysulfide moves between the cathode and the anode, or a space where sulfur in a solid phase is present is destroyed, thereby causing a negative influence on the capacity of the battery and the cycle properties.

Accordingly, there is a demand for development of a sulfur-carbon composite in which a sulfur-loading level in a sulfur-carbon composite formed of sulfur and a carbonaceous conductive material is increased and sulfur is uniformly distributed in the composite.

In addition, when the composite is used as the cathode active material of a lithium-sulfur secondary battery, it is necessary to develop a sulfur-carbon composite that may prevent sulfur in a reduced form from leaking according to the electrochemical oxidation-reduction reaction of the lithium-sulfur secondary battery.

SUMMARY

It is an object of the present disclosure to provide a sulfur-carbon composite having a structure in which a use rate of sulfur during an electrochemical oxidation-reduction reaction is improved by increasing a sulfur-loading level of the composite.

It is another object of the present disclosure to provide a sulfur-carbon composite which may prevent sulfur in the composite from leaking during an oxidation-reduction reaction.

It is another object of the present disclosure to provide a method of preparing a sulfur-carbon composite, by which the content of sulfur in the composite is easily controlled.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, there is provided a sulfur-carbon composite including a sulfur-containing amorphous carbon material and a carbonaceous conductive material.

In the sulfur-carbon composite, sulfur and an amorphous carbon material may be present by being aggregated through a pressure heat treatment and a carbonization process, and the sulfur may be equal to or greater than about 80 wt % compared to a total weight of the sulfur-carbon composite.

A ratio of the weight of sulfur in the sulfur-carbon composite after the pressure heat treatment and the carbonization process to the weight of sulfur in the sulfur-carbon composite before the pressure heat treatment and the carbonization process may be over 50%.

The amorphous carbon material may form a carbon matrix through the pressure heat treatment and the carbonization process, and a carbon component in the carbon matrix and the sulfur may be chemically bonded to each other.

As the sulfur may be uniformly dispersed and simultaneously captured in the carbon matrix, even when the sulfur is melted or evaporated, the sulfur may be prevented from leaking from the composite.

The carbonaceous conductive material may be at least one selected from carbon black, Ketjen black, lamp black, channel black, acetylene black, furnace black, thermal black, graphene, fullerene, carbon nanotubes, and carbon nanofibers.

The amorphous carbon material may be selected from petroleum pitch, coal tar pitch, chemical pitch, and a mixture thereof.

A softening point of the amorphous carbon material may range from about 30° C. to about 100° C.

In accordance with another aspect of the present disclosure, there is provided a method of preparing a sulfur-carbon composite, which includes a) preparing a melt by mixing an amorphous carbon material and sulfur to generate a sulfur-containing amorphous carbon material and performing a heat treatment on the sulfur-containing amorphous carbon material at a first heat treatment temperature, b) preparing a mixture by mixing a carbonaceous conductive material and the melt, c) generating an aggregate of the carbonaceous conductive material and the sulfur-containing amorphous carbon material by performing a heat treatment on the mixture at a second heat treatment temperature with a pressure ranging from about 1.5 bar to about 10 bar, and d) carbonizing the aggregate by performing a heat treatment on the aggregate at a third heat treatment temperature.

The first heat treatment temperature of the operation a) may be about 120° C. to about 200° C. The amorphous carbon material and the sulfur may be present in a molten state at a first heat treatment temperature. In the operation a), the amorphous carbon material and the sulfur may be uniformly mixed with each other in a molten state.

Furthermore, for the uniform mixing of the carbonaceous conductive material and the melt and the efficient intrusion of the melt into pores of the carbonaceous conductive material, the operation b) may be performed with a pressure ranging from about 1.5 bar to about 10 bar.

In addition, the operation c) may be performed at a second heat treatment temperature ranging from about 250° C. to about 350° C. to generate an aggregate of the carbonaceous conductive material and the sulfur-containing amorphous carbon material after melting again the amorphous carbon material and the sulfur, which are merely physically mixed, in a resultant of the operation b).

Additionally, the operation d) of performing a heat treatment at a third heat treatment temperature selected from a range of about 500° C. to about 1000° C. may be performed after the operation c). In the operation d), the amorphous carbon material in the aggregate may form a carbon matrix. Since the sulfur is uniformly dispersed in the carbon matrix of the amorphous carbon material and simultaneously chemically bonded to the carbon component forming the carbon matrix, the sulfur may be prevented from leaking from the composite.

BRIEF DESCRIPTION OF DRAWINGS

FIGS. 2A and 2B are scanning electron microscope (SEM) images showing sections of sulfur-carbon composites according to Example 1 of the present disclosure and Comparative Example 1, in which FIG. 2A shows Example 1 of the present disclosure and FIG. 2B shows Comparative Example 1.

FIGS. 3A and 3B are images showing results of energy-dispersive X-ray spectroscopy (EDX) component analysis of a section of a sulfur-carbon composite according to Example 1 of the present disclosure, in which FIG. 3A shows a distribution of a sulfur component, FIG. 3B shows a distribution of a carbon component.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Unless defined otherwise, all terms used herein including technical or scientific terms have the same meanings as those generally understood by those of ordinary skill in the art to which the present inventive concept may pertain.

An expression used in a singular form in the present specification also includes the expression in its plural form unless clearly specified otherwise in context.

Hereinafter, a sulfur-carbon composite according to embodiments of the present disclosure will be described in detail with reference to the attached drawings.

Figure 1:
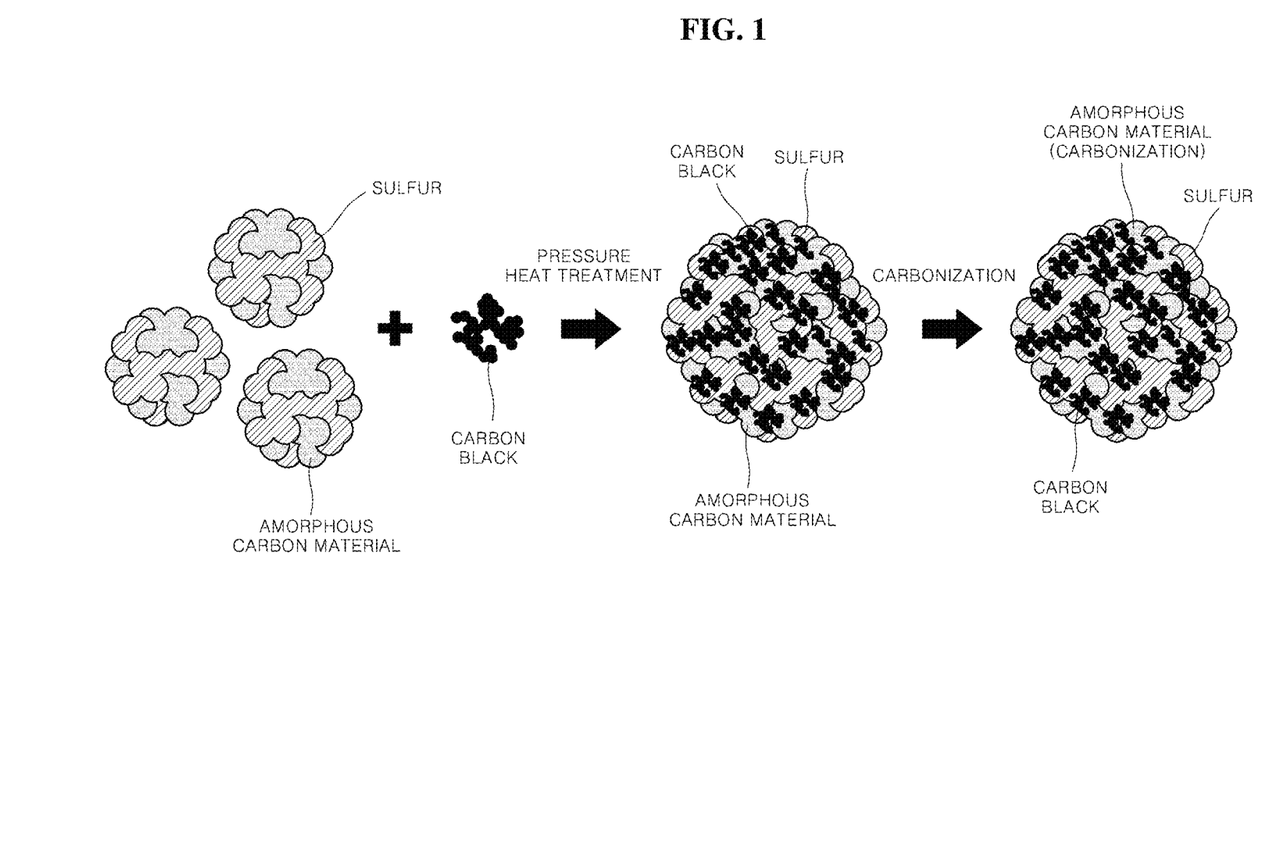
FIG. 1 schematically illustrates a method of preparing sulfur-carbon composite according to an embodiment of the present disclosure.

As illustrated in FIG. 1, a sulfur-carbon composite including a sulfur-containing amorphous carbon material and a carbonaceous conductive material may be provided according to an embodiment of the present disclosure.

In the present embodiment, the amorphous carbon material is a material that may be carbonized, forming a carbon matrix, and petroleum pitch, coal tar pitch, chemical pitch, or a mixture thereof may be used as the amorphous carbon material.

Also, the above-described amorphous carbon material may have a softening point in a range of about 30° C. to about 100° C. so as to be present in a liquid phase at around a melting point, that is, 115.21° C., of sulfur.

In the case in which the softening point of the amorphous carbon material is excessively higher or lower than a melting point of sulfur, when a mixture of the amorphous carbon material and the sulfur is melted and coated on a three-dimensional backbone structure of the carbonaceous conductive material, since the melting points of the amorphous carbon material and the sulfur are different from each other, the amorphous carbon material and the sulfur are not uniformly mixed in a melt so that the sulfur may be irregularly dispersed. Accordingly, sulfur-aggregates may be present in the composite or sulfur may be highly likely to be present only in a partial area of the composite.

The amorphous carbon material may include the sulfur in the form of an element or a sulfur compound. In this state, the sulfur may be uniformly dispersed in the amorphous carbon material.

In the sulfur-carbon composite according to an embodiment of the present disclosure, the sulfur and the amorphous carbon material may be present by being aggregated through a pressure heat treatment and a carbonization process.

In particular, the amorphous carbon material may form a carbon matrix through the pressure heat treatment and the carbonization process, and as the sulfur is uniformly dispersed and simultaneously captured in the carbon matrix, the amount of the sulfur leaking from the composite may be reduced.

Furthermore, as the sulfur is chemically bonded to a carbon component forming the carbon matrix, a possibility that the sulfur is separated from the carbon matrix in a temperature condition of over a general melting point or boiling point of sulfur may be reduced.

Accordingly, a ratio of the weight of sulfur in the sulfur-carbon composite after the pressure heat treatment and the carbonization process to the weight of sulfur in the sulfur-carbon composite before the pressure heat treatment and the carbonization process may be maintained to be over 50%.

In addition, in the sulfur-carbon composite according to an embodiment of the present disclosure, the sulfur and the amorphous carbon material are present in the composite by being aggregated through the pressure heat treatment and the carbonization process. In this state, the sulfur may be present over 80 wt % with respect to the total weight of the sulfur-carbon composite.

The sulfur and the amorphous carbon material in the sulfur-carbon composite according to an embodiment of the present disclosure may be present at a weight ratio of equal to or greater than about 2:1 and less than about 6:1.

When the weight ratio of the sulfur and the amorphous carbon material in the sulfur-carbon composite is equal to or greater than 6:1, that is, the content of the sulfur is excessively large or the content of the amorphous carbon material is excessively smaller than that of the sulfur, a content of the sulfur that may be chemically bonded to the carbon component forming the carbon matrix formed from the amorphous carbon material may be relatively small. As a result, a loading level of the sulfur that may be stably supported in the sulfur-carbon composite may decrease.

In addition, since the content of the sulfur captured in the carbon matrix formed from the amorphous carbon material decreases, the melted or evaporated sulfur may be highly likely to be leaked from the composite.

In contrast, when the weight ratio of the sulfur and the amorphous carbon material in the sulfur-carbon composite is less than 2:1, that is, the content of the sulfur is excessively small or the content of the amorphous carbon material is excessively larger than that of the sulfur, the content of the sulfur in the composite that is finally carbonized is relatively small so that, when the composite is used as a cathode active material of an electrode of a lithium-sulfur battery, the capacity of the battery is low and usability is deteriorated.

In the carbonaceous conductive material used in the present disclosure, a plurality of primary particles are thermally fused to each other forming a linear branch and a plurality of branches irregularly extending are combined together through physical collisions therebetween forming a three-dimensional backbone structure. The carbonaceous conductive material has a crystalline shape and/or a paracrystalline shape having a specific surface area compared to a volume.

Furthermore, the primary particles forming the carbonaceous conductive material used in the present disclosure may be porous particles each having a diameter of about 30 nm to about 100 nm. In this state, a plurality of primary particles forming the carbonaceous conductive material may include mesopores and micropores.

The mesopores may be defined to be pores, each having a diameter of about 2 nm to about 50 nm, and the micropores may be defined to be pores, each having a diameter of less than about 2 nm.

In addition, a space between the branches forming the three-dimensional backbone structure of the carbonaceous conductive material may be defined to be a macropore.

The above-described carbonaceous conductive material may be at least one selected from carbon black, Ketjen black, lamp black, channel black, acetylene black, furnace black, thermal black, graphene, fullerene, carbon nanotubes, and carbon nanofibers.

The aggregate of the sulfur and the carbonized amorphous carbon material may be aggregated with the carbonaceous conductive material, or may coat the three-dimensional backbone structure of the carbonaceous conductive material. Also, as the aggregate entirely or partially fills the mesopores and micropores in a plurality of primary particles forming the carbonaceous conductive material, the sulfur-loading level of the composite may be improved.

In this state, as the aggregate fills the mesopores and micropores in the primary particles of the carbonaceous conductive material, a possibility that the sulfur is separated from the composite due to a shuttle phenomenon of lithium-polysulfide generated during an electrochemical oxidation-reduction reaction may be reduced.

Furthermore, according to another aspect of the present disclosure, a unique method of preparing the above-described sulfur-carbon composite is provided as follows.

A method of preparing the sulfur-carbon composite according to an embodiment of the present disclosure includes the following operations:

a) preparing a melt by mixing an amorphous carbon material and sulfur to generate a sulfur-containing amorphous carbon material and performing a heat treatment on the sulfur-containing amorphous carbon material at a first heat treatment temperature;

b) preparing a mixture by mixing a carbonaceous conductive material and the melt;

c) generating an aggregate of the carbonaceous conductive material and the sulfur-containing amorphous carbon material by performing a heat treatment on the mixture at a second heat treatment temperature with a pressure ranging from about 1.5 bar to about 10 bar; and d) carbonizing the aggregate by performing a heat treatment on the aggregate at a third heat treatment temperature.

The operation a) is to prepare a melt in which the sulfur and the amorphous carbon material are physically mixed.

In the operation a), the sulfur and the amorphous carbon material are mixed at a weight ratio of equal to or greater than 2:1 and less than 6:1.

As described above, when the content of the amorphous carbon material with respect to the sulfur is excessively small, a relative content of the sulfur to be stably dispersed in the carbon matrix formed from the amorphous carbon material decreases and thus the loading level of the sulfur in the sulfur-carbon composite may decrease.

In addition, since the content of the sulfur captured in the carbon matrix formed from the amorphous carbon material decreases or a possibility that the sulfur is exposed from a surface of the amorphous carbon material increases, the melted or evaporated sulfur may be highly likely to be leaked from the composite.

In contrast, when the content of the sulfur with respect to the amorphous carbon material is excessively small, the content of the sulfur in the finally produced sulfur-carbon composite is relatively small. Accordingly, when the composite is used as a cathode active material of an electrode of a lithium-sulfur battery, the capacity of the battery is low and usability is deteriorated.

Next, the mixture of the amorphous carbon material and the sulfur is heated at the first heat treatment temperature.

In this state, the first heat treatment temperature is a temperature for melting the amorphous carbon material and the sulfur, which is generally performed at a temperature of 120° C. to 200° C. around the melting point of sulfur.

The amorphous carbon material may have a softening point equal to or less than the first heat treatment temperature so that the amorphous carbon material is melt to a liquid phase at the first heat treatment temperature.

The operation b) is to physically mix the melt prepared by the operation a) and the carbonaceous conductive material. In this state, the melt and the carbonaceous conductive material may be physically mixed by grinding or milling.

In the operation b), the carbonaceous conductive material and the melt may be mixed at a weight ratio of about 1:35 to about 1:45.

When the amount of the melt prepared in the operation a) is excessively smaller than the amount of the carbonaceous conductive material, the content of the sulfur in the finally produced sulfur-carbon composite may be relatively small. In contrast, when the amount of the melt prepared in the operation a) is excessively larger than the amount of the carbonaceous conductive material, the physical mixing of the carbonaceous conductive material and the melt is not sufficiently made so that carbide of the sulfur-containing amorphous carbon material in the finally produced sulfur-carbon composite is present in the form of an aggregate in a partial area and thus a use of the sulfur may be reduced.

In this state, the operation b) to facilitate the uniform mixing of the carbonaceous conductive material and the melt and to allow the melt to efficiently intrude into the pores of the carbonaceous conductive material may be performed with a pressure ranging from about 1.5 bar to about 10 bar.

As a result of the operation b), since the carbonaceous conductive material and the melt are randomly mixed, the sulfur present in an aggregated form only in a partial area of the carbonaceous conductive material is melted again and simultaneously, in order to generate an aggregate of the carbonaceous conductive material and the sulfur-containing amorphous carbon material, the operation c) may be performed at the second heat treatment temperature with a pressure ranging from about 1.5 bar to about 10 bar.

In this state, the second heat treatment temperature may be higher than the first heat treatment temperature. In detail, the second heat treatment temperature of the operation c) may be generally a temperature of about 250° C. to about 350° C. around a boiling point of the sulfur.

In the preparation of a conventional sulfur-carbon composite, a sulfur evaporation technology is used, in which, after having melted sulfur particles intrude into the carbonaceous conductive material, sulfur particles that overly intruded into or are aggregated in a partial area of the carbonaceous conductive material are removed by performing a heat treatment at a temperature around the boiling point of the sulfur to evaporate the sulfur.

However, unlike the conventional technology, in the present disclosure, instead of performing a heat treatment at a temperature around the boiling point of the sulfur to remove the overly intruding or aggregated sulfur particles, it is characteristic that an aggregate in which the carbonaceous conductive material and the sulfur-containing amorphous carbon material are uniformly mixed is generated, and a process is performed with a pressure ranging from about 1.5 bar to about 10 bar under a high temperature condition to form a chemical bond between a carbon component forming the carbonaceous conductive material and/or the amorphous carbon material and the sulfur.

In the operation c), even when a heat treatment is performed at a temperature around the boiling point of the sulfur, since the pressure condition is added, the sulfur remains captured in the aggregate without leaking from the composite as the sulfur is melted or evaporated.

Accordingly, according to an embodiment of the present disclosure, since a difference between the content of the sulfur used as a raw material and the content of the sulfur remaining after the heat treatment is not much, the content of sulfur in the sulfur-carbon composite may be easily adjusted, as necessary.

In addition, an aromatic or aliphatic carbon component forming the carbonaceous conductive material and the amorphous carbon material forms a chemical bond with the sulfur through the operation c) performed under the high temperature and high pressure conditions. Accordingly, a bonding force with the sulfur may be improved compared to the composite in which sulfur is merely physically mixed.

Additionally, the present disclosure may further include the operation d) of performing a heat treatment at a third heat treatment temperature selected from a range of about 500° C. to about 1000° C., after the operation c) of generating an aggregate of the carbonaceous conductive material and the sulfur-containing amorphous carbon material.

The operation d) is a carbonization process of the amorphous carbon material. The carbonization process means a process of allowing carbon only to remain by baking a carbon material at high temperature.

The amorphous carbon material forms a carbon matrix through the operation d), and the sulfur in the amorphous carbon material may be uniformly dispersed without being aggregated in the carbon matrix.

Furthermore, as the sulfur is present by being captured in the carbon matrix, even when a heat treatment is performed at a temperature over the melting point or boiling point of sulfur, the sulfur may be prevented from leaking from the composite. Accordingly, the content of sulfur in the composite may be easily adjusted, as necessary.

In addition, since the sulfur forms a strong chemical bond with the carbon component forming the carbon matrix, a possibility that the sulfur is separated from the carbon matrix may be reduced even in a temperature condition of over the general melting point or boiling point of the sulfur.

In the following description, detailed examples of the present disclosure are presented below. However, the below-described examples are merely presented to exemplify or describe the main concepts of the present disclosure, and not limit the present disclosure.

Method of Preparing a Sulfur-Carbon Composite

Example 1

A melt was prepared by mixing petroleum pitch and sulfur powder and melting a mixture at 150° C. and then the melt was mixed with carbon black (super P) powder, thereby preparing a mixture. In this state, the weight ratio of the petroleum pitch, the sulfur, and the carbon black was 15:30:1.

The mixture was solidified through a second heat treatment with a pressure of 7 bar at 300° C. for three hours. Then, the mixture passed through a third heat treatment at 500° C. for one hour so that a sulfur-carbon composite was prepared.

Example 2

A melt was prepared by mixing petroleum pitch and sulfur powder and melting a mixture at 150° C. and then the melt was mixed with carbon black (super P) powder, thereby preparing a mixture. In this state, the weight ratio of the petroleum pitch, the sulfur, and the carbon black was 10:30:1.

The mixture was solidified through a second heat treatment with a pressure of 7 bar at 300° C. for three hours. Then, the mixture passed through a third heat treatment at 500° C. for one hour so that a sulfur-carbon composite was prepared.

Example 3

A melt was prepared by mixing petroleum pitch and sulfur powder and melting a mixture at 150° C. and then the melt was mixed with carbon black (super P) powder, thereby preparing a mixture. In this state, the weight ratio of the petroleum pitch, the sulfur, and the carbon black was 7:30:1.

The mixture was solidified through a second heat treatment with a pressure of 7 bar at 300° C. for three hours. Then, the mixture passed through a third heat treatment at 500° C. for one hour so that a sulfur-carbon composite was prepared.

Comparative Example 1

In Comparative Example 1, the same type and content of the carbon black powder and the sulfur powder of Example 1, except the pitch, were used. After physical mixing (grinding), the mixture was solidified through a first heat treatment at 150° C. for five hours and a second heat treatment with a pressure of 7 bar at 300° C. for three hours. Then, the mixture passed through a third heat treatment at 500° C. for one hour so that a sulfur-carbon composite was prepared.

Comparative Example 2

In Comparative Example 2, a sulfur-carbon composite was prepared in the same method as Example 1. In this state, the weight ratio of the petroleum pitch, the sulfur, and the carbon black was 5:30:1.

Analysis of the Properties of a Sulfur-Carbon Composite (1) Results of scanning electron microscope (SEM) image analysis and energy-dispersive X-ray spectroscopy (EDX) component analysis of a section of a sulfur-carbon composite.

Figure 2A:
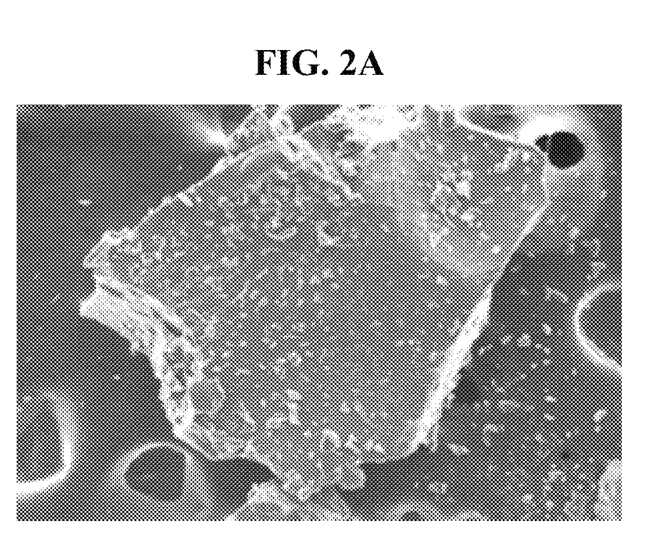
Figure 2B:
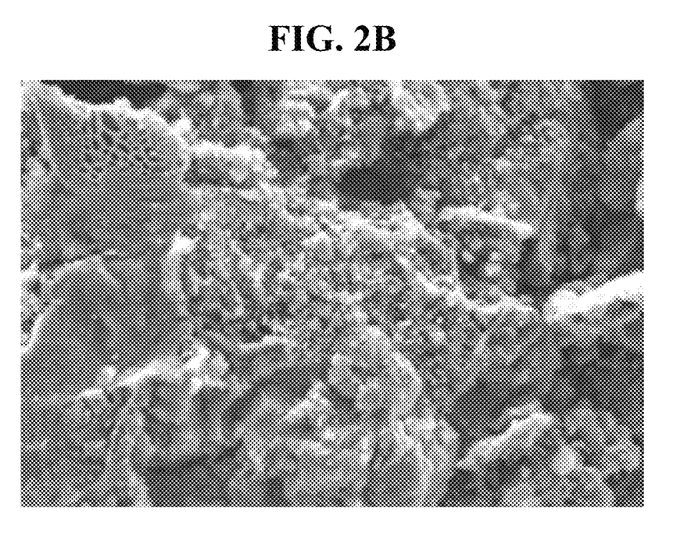

FIGS. 2A and 2B are SEM images showing sections of sulfur-carbon composites according to Example 1 of the present disclosure and Comparative Example 1, in which FIG. 2A shows Example 1 of the present disclosure and FIG. 2B shows Comparative Example 1.

Figure 3A:
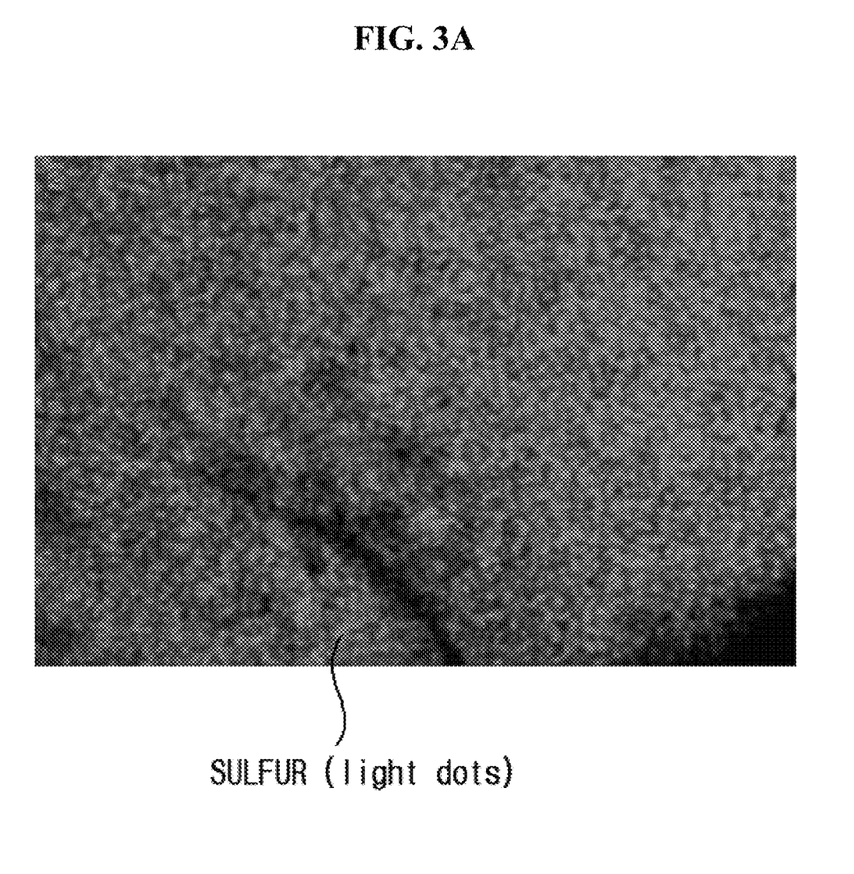
Figure 3B:
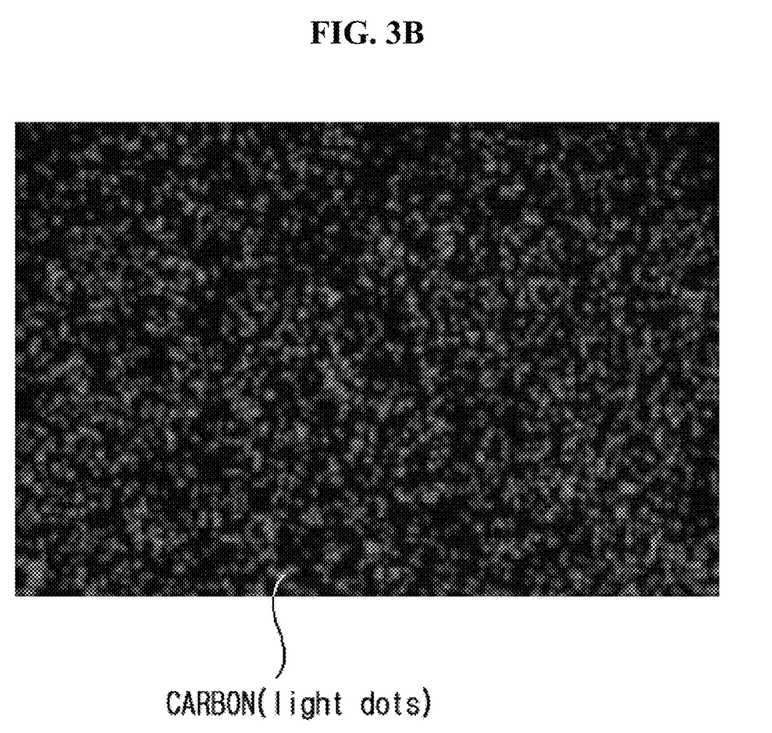

FIGS. 3A and 3B are images showing results of EDX component analysis of a section of a sulfur-carbon composite according to Example 1 of the present disclosure; in which FIG. 3A shows a distribution of a sulfur component, FIG. 3B shows a distribution of a carbon component.

The SEM image analysis through FIGS. 2A and 2B is used to check whether the sulfur in the composite leaks or a structural change occurs in the composite when the sulfur-carbon composite particles pass through the third heat treatment (carbonization process).

Referring to FIG. 2B showing a SEM image of a section of a sulfur-carbon composite according to Comparative Example 1, as the sulfur in the sulfur-carbon composite leaks by being evaporated through a heat treatment at 500° C. that is over the boiling point of the sulfur, the structure of the composite is destroyed and moreover an aggregation phenomenon occurs in which the particles in the composite are aggregated together.

In contrast, referring to FIG. 2A showing the SEM images of a section of a sulfur-carbon composite according to Example 1, it can be seen that the destruction of a structure of the composite and the particle aggregation phenomenon do not occur. It may infer that leakage from the composite may be reduced because a carbon matrix is formed through the carbonization process of petroleum pitch and the sulfur in the composite is captured in the carbon matrix.

Referring to FIGS. 3A and 3B showing results of EDX component analysis of a section of a sulfur-carbon composite according to Example 1, even though a heat treatment is performed at 500° C. that is over the boiling point of the sulfur, a large amount of sulfur is present by being uniformly dispersed in the composite.

In other words, according to the results of the SEM image analysis and the EDX component analysis of a section of the sulfur-carbon composite, it can be seen that, in the sulfur-carbon composite according to an embodiment of the present disclosure, the sulfur in the composite forms a strong chemical bond with the carbonaceous conductive material and/or the carbon component forming the carbon matrix from the amorphous carbon material, a possibility that the sulfur leaks from the composite is reduced.

Figure 4:
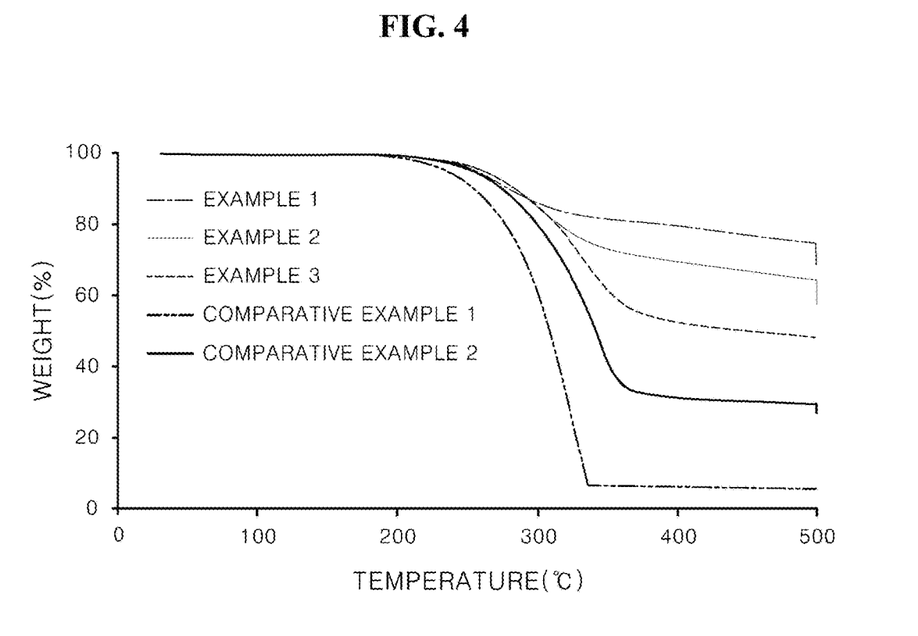
FIG. 4 is a flowchart for describing a result of thermal gravity analysis (TGA) of sulfur-carbon composites according to Examples 1 to 3 and Comparative Examples 1 and 2.

(2) Comparison of Results of Thermal Gravity Analysis (TGA) of a Sulfur-Carbon Composite FIG. 4 is a flowchart for describing a result of thermal gravity analysis (TGA) of sulfur-carbon composites according to Examples 1 to 3 and Comparative Examples 1 and 2.

The TGA was performed by using a thermogravimetric analyzer "TGA Q800" (TA Instruments, USA) under a nitrogen atmosphere (gas flow rate: 70 mL/min) at a heating rate of 20° C./min from 20° C. to 500° C.

The results of TGA of the sulfur-carbon composites according to Examples 1 to 3 and Comparative Examples 1 and 2 when the temperature reaches at 500° C. are shown in Table 1 below.

TABLE 1

| | Mass reduction rate (%) | Component rate in composite at 500° C. (wt %) | | Sulfur remaining rate at 500° C. compared to 20° C. (%) |
|---|---|---|---|---|
| | | Sulfur | Carbon | |
| Comparative Example 1 | 94.53 | 41% | 59% | 2.31% |
| Comparative Example 2 | 71.07 | 30% | 70% | 10.50% |
| Example 1 | 31.54 | 87% | 13% | 90.88% |
| Example 2 | 35.76 | 88% | 12% | 77.29% |
| Example 3 | 52.66 | 86% | 144% | 51.61% |

Referring to FIG. 4 and Table 1, it can be seen that the weight of the sulfur-carbon composite according to Comparative Example 1 sharply decreases toward about 300° C. or higher, which is a temperature around the boiling point of the sulfur, and then is maintained at a constant level.

In other words, the weight maintains constant after only the carbon component of the carbon black is left as most of the melted and evaporated sulfur leaks from the sulfur-carbon composite according to Comparative Example 1.

In this state, the sulfur-carbon composites according to Examples 1 to 3 has relatively lower mass reduction rate than the sulfur-carbon composites according to Comparative Examples 1 and 2 and further has a meaningfully higher sulfur remaining rate (50% or higher) at 500° C. than the sulfur remaining rate at 20° C.

In particular, at 500° C., the component rates of the sulfur-carbon composites according to Comparative Examples 1 and 2 are about 30% to about 40%, whereas the component rates of the sulfur-carbon composites according to Examples 1 to 3 are over about 80%.

In other words, according to the above results, in the case of the sulfur-carbon composites according to various embodiments of the present disclosure, although a heat treatment is performed at a temperature higher than the boiling point of the sulfur, leakage of the sulfur from the sulfur-carbon composite is reduced.

In addition, the sulfur-carbon composite according to Comparative Example 2, which is prepared by the same method as the methods used for the sulfur-carbon composites according to Examples 1 to 3, may corresponds to a case in which the content of petroleum pitch is excessively small compared to the content of sulfur.

In this case, although the carbon matrix is formed by carbonizing the amorphous carbon material, the mass reduction rate is about 70%, in particular, the sulfur remaining rate is about 10% at 500° C. compared to 20° C. Accordingly, it can be seen that most sulfur leaks from the composite.

In other words, in the sulfur-carbon composite according to Comparative Example 2, since the content of petroleum pitch is relatively smaller than the content of sulfur, a relative content of sulfur that may be stably dispersed in the carbon matrix formed through the carbonization of the petroleum pitch decreases. Accordingly, it can be seen that most sulfur present in the composite in an excess amount are melted and evaporated leaking from the composite.

According to the present disclosure, since the sulfur and the amorphous carbon material in the sulfur-carbon composite are used by being aggregated, the sulfur-loading level of the composite and the sulfur-remaining rate may be improved.

Furthermore, according to the present disclosure, since the sulfur in the sulfur-carbon composite forms a strong chemical bond with the carbon matrix formed through the pressure heat treatment and the carbonization process of the amorphous carbon material, the sulfur may be prevented from leaking from the composite.

Furthermore, according to the present disclosure, since the sulfur is present by being captured in the amorphous carbon material, even when a heat treatment is performed at a temperature over the melting point or the boiling point of the sulfur during the preparation of the sulfur-carbon composite, the sulfur may be prevented from leaking from the composite. Accordingly, the sulfur content in the composite may be easily adjusted, as necessary.

The present disclosure described above may be variously substituted, altered, and modified by those skilled in the art to which the present inventive concept pertains without departing from the scope and sprit of the present disclosure. Therefore, the present disclosure is not limited to the above-mentioned exemplary embodiments and the accompanying drawings.

What is claimed is:

1. A method of preparing a sulfur-carbon composite, the method comprising:
    a) preparing a melt by mixing an amorphous carbon material and sulfur to generate a sulfur-containing amorphous carbon material and performing a heat treatment on the sulfur-containing amorphous carbon material at a first heat treatment temperature;
    b) preparing a mixture by mixing a carbonaceous conductive material and the melt;
    c) generating an aggregate of the carbonaceous conductive material and the sulfur-containing amorphous carbon material by performing a heat treatment on the mixture at a second heat treatment temperature with a pressure ranging from about 1.5 bar to about 10 bar; and
    d) carbonizing the aggregate by performing a heat treatment on the aggregate at a third heat treatment temperature.

2. The method of claim 1, wherein a ratio of a weight of the sulfur in a resultant of the operation d) to a weight of the sulfur in a resultant of the operation a) is equal to or greater than 50%.

3. The method of claim 1, wherein, in the operation a), the sulfur and the amorphous carbon material are mixed at a weight ratio of equal to or greater than 2:1 and less than 6:1.

4. The method of claim 1, wherein the first heat treatment temperature of the operation a) is about 120° C. to about 200° C.

5. The method of claim 1, wherein the operation b) is performed with a pressure ranging from about 1.5 bar to about 10 bar.

6. The method of claim 1, wherein, in the operation b), the carbonaceous conductive material and the melt are mixed at a weight ratio of about 1:35 to about 1:45.

7. The method of claim 1, wherein the second heat treatment temperature of the operation c) is about 250° C. to about 350° C.

8. The method of claim 1, wherein the third heat treatment temperature of the operation d) is about 500° C. to about 1000° C.

* * * * *